Patented Nov. 23, 1937

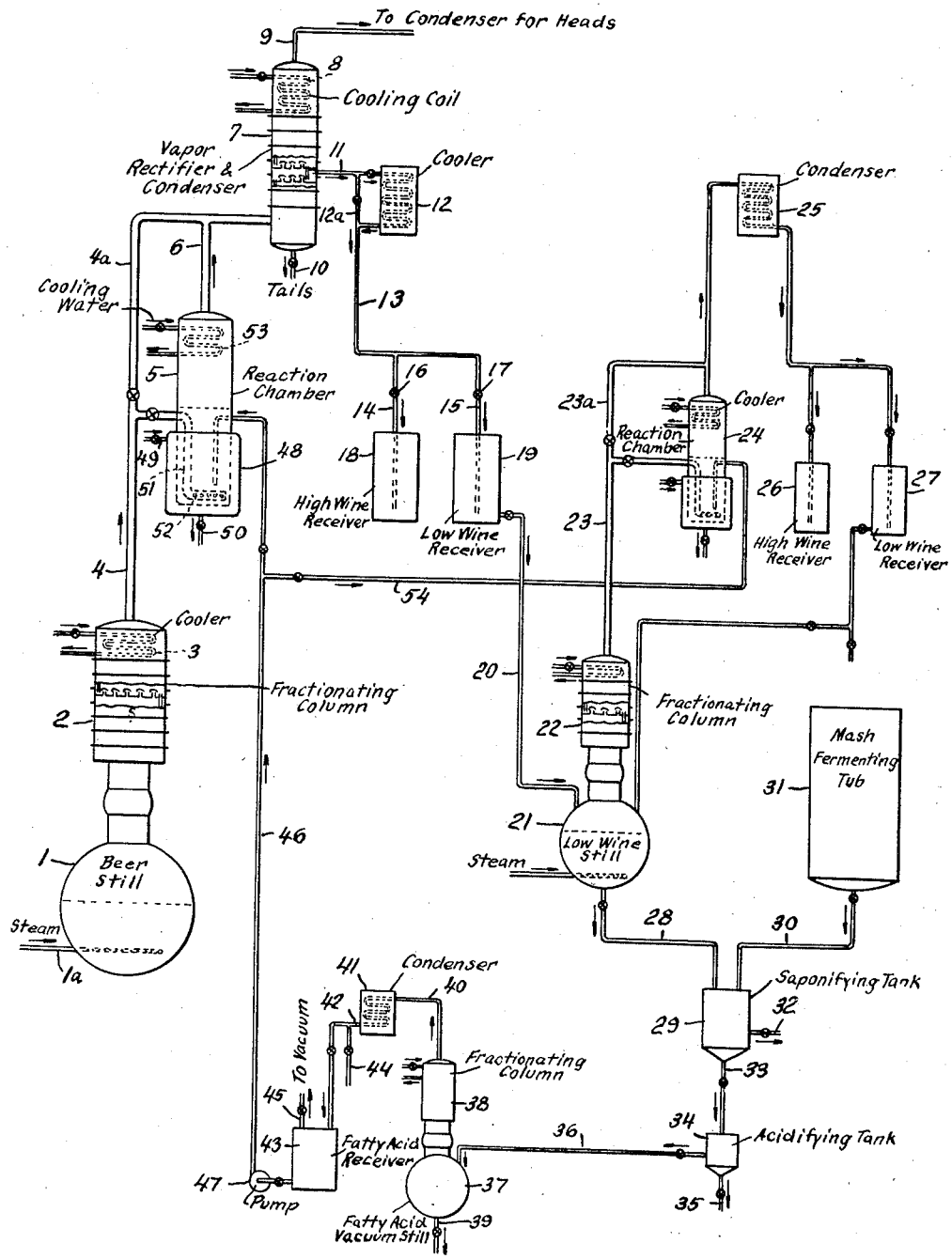

2,099,864

UNITED STATES PATENT OFFICE 2,099,864

PROCESS FOR MANUFACTURE OF DISTILLED SPIRITS

Fred E. Miller, Philadelphia, Pa., assignor to Semet Solvay Engineering Corporation, New York, N. Y., a corporation of New York Application May 26, 1934, Serial No. 727,618

3 Claims. (Cl. 99—48)

This invention relates to the production of spirituous liquors of improved flavor, body, and aroma. In the manufacture of alcoholic liquors, such as whiskey, brandy, rum, etc., it was at one time common to effect distillation of the liquors resulting from fermentation of the mash or wort, hereinafter referred to as "beer", in a so-called "pot-still" etc., a simple distillation apparatus wherein the beer was heated by the direct action of the fire or by steam. Distilled liquors obtained by this method were highly flavored and possessed an agreeable taste and smell.

In more recent years the old distillation apparatus has been replaced by continuous column stills or batch stills equipped with fractionating columns in order to obtain improved heat economies and more complete separation of alcoholic distillate from the beer. The substitution of these new types of apparatus for the old has been found, however, to yield products possessing low body and having a poorer flavor and aroma than products formerly produced.

In accordance with the present invention I have found that by suitable regulation or alteration of the distillation procedure, as hereinafter more fully described, not only may spirituous liquors of improved body, flavor, and aroma be obtained, but products may be produced possessing these qualities to an even greater extent than those resulting from the operation of the less used pot stills. Furthermore, the products of my improved process require a substantially reduced period of time for aging, since they already possess to a very material extent upon their recovery from the distillation the qualities desired in the final product.

The process of the present invention is applicable to the distillation of fermented mashes in either batch or continuous types of distillation equipment. In connection with batch equipment, it is especially suitable for the improvement of liquors obtained from stills equipped with fractionating columns, for the reason that such columns, like the continuous column still, ordinarily yield distilled spirits having a poor flavor and lacking body and aroma.

In accordance with the present invention the beer is distilled in the usual manner. The distillate, which has a relatively high alcohol content, is brought into intimate association at an elevated temperature with aliphatic acids originating in a fermented mash. The acids may be obtained from the low wines of that or a preceding beer distillation, or from the residual mash remaining in the fermenter after conducting the beer to the still, or even from the residual slop from the beer still.

Preferably those acids are employed which contain more than four and less than eleven carbon atoms in the molecule. These acids may be extracted from the residual mash, either before or after a separatory distillation by forming insoluble salts thereof with a suitable alkaline material, and by separating the salts, for instance the metal salts or soaps such as those of calcium, from the remaining liquid. The acids may be extracted from the distillate fraction usually referred to as "low wines". In extracting aliphatic acids from the low wine fraction, this fraction is preferably distilled to separate a substantial portion of its alcoholic content; the residue then may be saponified in the same manner as the residual mash. In either case the saponification may be effected advantageously by means of lime or other suitable alkaline reagent and after separation of the insoluble soap from residual liquor, the soap may be treated with an inorganic acid to liberate the fatty acids. Sulfuric acid may be used to advantage for this purpose. After separation of the free fatty acids from the sulfuric acid they may be washed with water to eliminate traces of sulfuric acid which were not removed in the separation step. The aliphatic acids above C4 are insoluble in water, or sparingly so, the acids below C4 are soluble in water and a considerable portion may be removed with the wash water. The free aliphatic acids remaining may be fractionally distilled in order to eliminate those acids containing more than ten carbon atoms. By the foregoing separation and purification process the desired fatty acids may be obtained without substantial dilution by other substances. It will be understood that such higher acids may of course be present in the final product in small quantities but reasonably complete elimination is desirable. The separation of higher acids may be effected at any desired stage of the process.

The purified fatty acids may be brought into intimate contact with the alcoholic vapors or condensate of the distillation process, in any suitable manner so as to form fatty acid esters, which greatly enhance the flavor, body, and aroma of the final product. This intimate contact or association may be effected either in combination with and as a part of the main distillation process or as a separate distillation, boiling, or refluxing step. High alcohol concentration and high temperature favor the desired reaction. Hence it is desirable to bring the acids into contact with vapors or condensate possessing a relatively high alcoholic content. Suitable conditions for causing this reaction may be obtained by effecting repeated distillation and condensation of the alcoholic distillate containing on the order of 40% to 70% of ethyl alcohol in the presence of the concentrated fatty acids, preferably at about 80° to 100° C. Under normal conditions the acid concentration should be above about 40%.

A convenient type of reaction chamber for this treatment comprises a steam heated boiler or distillation vessel adapted to vaporize liquid contained in the lower portion thereof and having above this heated portion cooling means arranged to condense vapors. In other words, the reaction vessel is in essence a still equipped with a reflux condenser. The vapors passing from the fractionating column of the beer still pass into the reaction chamber and bubble up through the liquid at the bottom thereof and are thereby brought into intimate reactive relation with the free acids causing esterification to take place and at the same time assisting vaporization of resulting esters. The vapors after bubbling through the fatty acids pass up through the reflux condenser. It is quite probable that free acids will also be carried into this condenser partly by evaporation and partly be entrainment but this is not at all undesirable. On the contrary, it serves to improve the intimacy of contact between the alcoholic distillate and the acids. A portion of the alcohol is condensed in the reflux condenser and the free acids are either condensed out or washed from the vapors by the condensate. That portion of the vapors which passes through the condenser will contain the esters formed in the reaction chamber as well as the other constituents of a whiskey distillate.

In order that my invention may be more fully understood, the following description of one embodiment thereof is set forth illustrated by the accompanying drawing.

The drawing represents diagrammatically apparatus arranged for carrying out the process of the present invention in connection with a batch still equipped with a fractionating column. The still for the distillation of the fermented mash is designated by numeral 1 and is equipped with a fractionating column 2 of any convenient type such as the bubble tray arrangement shown having a cooling coil 3 near the top thereof. The still and column, as well as the rest of the system described below, may be provided with heat insulation (not shown). The still 1 is provided with the usual means (not shown) for charging mash from the fermenting tub and for discharging distillation residue. It is arranged to be heated by introduction of steam through perforated pipe coil 1a.

From the top of fractionating column 2 a vapor line 4 leads to a reaction chamber 5 wherein the vapors are brought into intimate association with fatty acids as hereinafter more fully described, and a branch line 4a leads into another vapor line 6 which joins the top of reaction chamber 5 to a rectifier or fractionator 7.

Rectifier 7 is provided with a cooling coil 8, a vapor line 9 at the top for removal of "heads", aldehydes, etc., a liquid draw-off 10 at the bottom for removal of "tails", and a liquid draw-off 11 intermediate the top and bottom for removing the potable fraction and conducting it to a cooler 12.

Cooler 12, which may be water-cooled, is connected by a pipe 13 having branches 14 and 15 and provided with valves 16 and 17 to suitable receivers 18 and 19. A by-pass 12a may be provided around cooler 12. The receivers 18 and 19 may be any suitable storage tanks for reception of the final product and a low wine distillate.

Receiver 19 is arranged for collecting the low wines and is joined by valved conduit 20 to a still 21. The still 21, although it may be a simple still, preferably is provided with a fractionating column 22. This column may have provision for removal of a portion of the reflux therefrom. A valved conduit 23 is arranged to conduct vapors from this rectifying column to a reaction chamber 24 and from there through condenser 25 to suitable storage means 26 and 27. A valved conduit 23a is arranged to pass vapors from the column 22 directly to condenser 25. The still 21 is provided with an outlet for still residue, which leads by means of pipe 28 to a tank 29. A pipe 30 from the fermenting tub 31, also is shown for conveying liquid from the fermenting tub to the tank 29.

Tank 29 is provided with a liquid draw-off 32 and a second draw-off 33 which leads to a second tank 34. Each of tanks 29 and 34 may be arranged to effect decantation as will be more fully described. Tank 34 may have a drain 35 at the bottom thereof and is joined by pipe-line 36 to a vacuum still 37.

Still 37 is shown provided with a fractionating column 38 similar to the columns 2 and 22. It also has a suitable outlet 39 for discharging residue. From the column 38 a vapor line 40 leads to condenser 41. A pipe line 42 is provided to convey condensate to receiver 43. It also may have a draw-off 44 for separate recovery of a portion of the distillate. A vacuum line 45 is shown on receiver 43. The still 37 is preferably arranged to effect the vacuum distillation of fatty acids and hence should be suitably designed to operate at reduced pressures. From receiver 43 a pipe line 46 leads to reaction chamber 5. This pipe line 46 is provided with a suitable pump 47.

The reaction chamber 5 comprises a steam heated boiler or distillation vessel having a steam jacket 48 around the lower portion thereof with steam inlet 49 and water outlet 50. The distillation vessel is adapted to contain a body of fatty acids. A pipe 51 having perforations 52 extends to near the bottom of this vessel and is arranged to conduct vapors from vapor line 4 into the body of liquid so that they will bubble up therethrough. A cooling coil 53 is provided in the vapor space of chamber 5. Reaction chamber 24 may be of the same type as chamber 5 on a smaller scale and may receive fatty acids from receiver 43 by means of pump 47, pipe-line 46, and branch line 54.

The operation of this apparatus may be as follows when applied to the production of rye whiskey:

500 gallons of beer (a rye mash fermented as usual for a period of 2 to 3 days) are charged from tub 31 to still 1. Still 1 is heated by the introduction of steam through the perforated coil 1a. The vapors of this distillation pass up through rectifying column 2 and into contact with cooling coil 3 whereby they are fractionally condensed and the condensed fraction is refluxed down through the fractionating column to the still. In this manner a strong alcoholic distillate containing on the order of 50% alcohol is obtained and passes in vapor phase through conduit 4 into the bottom of reaction chamber 5 where it bubbles up through a body of the fatty acids derived from a fermented mash and containing less than eleven carbon atoms in the acid molecule. The reaction chamber is maintained at an elevated temperature by means of the steam jacket 48 with which it is provided. A cooling fluid such as water is circulated through coil 53 to cause a partial condensation of vapors evolved from the body of liquid. Fractionation is not desired at this point because this would tend to reduce the alcoholic content of the liquid in the chamber. The cooling coil effects partial condensation without any great amount of fractionation. Vapors not condensed by the action of this cooling coil pass off through pipe 6 to rectifier and fractional condenser 7 where condensation of the alcoholic fraction is obtained. The flow of cooling fluid through pipe coil 8 is so regulated that all but aldehydes and other light ends or "heads" are here condensed. Heavy ends or "tails" are refluxed to the bottom of the column and withdrawn at 10. With suitable insulation of the column 7 heating means are not necessary at the bottom of the column though such means of course may be provided. The desired distillate fraction is withdrawn through pipe 11, cooler 12, and pipes 13 and 14 to receiver 18, valve 16 being open and valve 17 being closed.

After the removal of that distillate having the alcohol content desired in the product, for instance after removal of around forty gallons of 50% alcohol condensate, there still remains in the residue in still 1 a considerable proportion of alcohol and most of the original fatty acid content of the beer. Accordingly, when this point is reached (ordinarily when about 8% or 10% of the charge has been distilled off and collected in receiver 18) valve 14 is closed, valve 15 is opened, and the distillation is continued to obtain around sixty gallons of low wines in receiver 19. During collection of low wines reaction chamber 5 and cooler 12 may be by-passed so as to avoid removal of fatty acids from the reaction chamber and so as to conserve the sensible heat of the condensate finally recovered. It will be understood, of course, that the quantity of low wines recovered will depend largely on the efficiency of fractionating column 2 and hence may vary not only depending upon conditions of fermentation, etc. but also upon the particular distillation equipment employed.

The low wines so recovered, which may be at an elevated temperature, are transferred to still 21 where around 40% or 50% of the sixty gallon charge is removed in vapor form. Two or more distillate fractions may be recovered, if desired. With a suitable fractionating column, a portion (around 20 gallons) of distillate may be collected as 100-proof whiskey. During this distillation vaporous distillate may be passed through reaction chamber 24 and treated with fatty acids in the same manner as the high alcohol distillate from still 1 to form fatty acid esters and thereby improve its character. The distillation then may be continued, vapors passing through by-pass 23a to condenser 25 until around five gallons of a more dilute distillate are obtained. This distillate is somewhat similar to the low wine fraction charged to still 21 and hence may be collected separately and returned to the still 21 for redistillation with a subsequent charge.

The 35 gallons of residue from the distillation are conveyed through pipe 28 to tank 29. The residue remaining in the fermenting tub 31 which may amount to 8% to 10% of the total charge of mash, for instance 40 gallons, likewise is conducted to tank 29. Lime or another suitable alkali is then added to the 75 gallon charge to cause saponification of fatty acids present. The resultant slurry is permitted to settle and the major portion, say 65 to 70 gallons of the liquid, is drawn off through valved outlet 32. The remaining slurry is introduced through pipe 33 to tank 34 where it is acidified with dilute sulfuric acid. Solid matter is allowed to settle out and the supernatant liquid is withdrawn through pipe 36 to vacuum still 37. The residual slurry may be withdrawn at 35 and suitably disposed of. In still 37 the liquid is subjected to a distillation under a vacuum of around 25 inches of mercury and the distillate coming off up to around 120° C. is collected in receiver 43. Distillation residue may be drawn off from the still through outlet 39. A small portion of the first distillate coming off from still 37 may be removed through pipe 44, if desired, this portion of the distillate consisting for the most part of materials other than the desired acids. Pipe 44, of course, should be connected to suitable evacuating and collecting means (not shown) when the early distillate is separately recovered. The distilled acids are conveyed by means of pump 47 through pipe 46 to the reaction chamber 5 to serve as the body of fatty acid containing liquid in this chamber for the treatment of vapors from a subsequent charge of beer.

As previously mentioned, cooler 12 may be by-passed during low wine distillation so that the low wines will be recovered in low wine receiver 19 while they are only slightly below the initial boiling point. By conveying them directly to still 21, their sensible heat may be conserved and less heating will be required for the redistillation.

The first part of the distillate obtained in effecting the redistillation in still 21 is a high wine or whiskey fraction and this is followed by a low wine fraction. In a batch redistillation the first low wines recovered will possess a high alcohol content as compared with those coming over later hence it may be desirable to return only a portion of the low wines to still 21, for instance the first half of this distillate, in which case the remainder may be disposed of in any suitable manner.

While a second reaction chamber 24 has been shown for treating the high wines recovered from the distillation in still 21, it will be obvious that the reaction of alcohol with fatty acids may be carried out exclusively in the reaction chamber 5 and the high wine recovered in the receiver 26 may be added to the product recovered in receiver 18. In this case, of course, the second reaction chamber may be dispensed with.

It will be understood that in many prior distillation processes some fatty acids have been carried over with the alcoholic vapors or otherwise contacted therewith but in such cases the concentration of fatty acids has been so low that their effect on the product has been negligible and in most cases the fatty acids containing more than four carbon atoms have been entirely absent. Then too any contact between the acids and concentrated alcohol vapors at a high temperature has been incidental and of such short duration that little or no esterification could take place. The products prepared according to the present invention are readily distinguished from such ordinary products by the full body and the fine flavor and aroma of these new products.

In this application proportions have been expressed as liquid volume percentages.

I claim:

1. In the manufacture of a potable spirit of high ester content from fermented grain, the improvement which comprises distilling a fermented grain beer to form an alcoholic distillate having an alcohol content above 40%, distilling off an aqueous aliphatic acid concentrate from a fermented grain beer, neutralizing the acids of said concentrate by means of an alkaline calcium compound to form water-insoluble calcium compounds of acids containing more than 4 carbon atoms, mechanically separating the insolubles from aqueous solution, acidifying the insolubles to liberate free acids from said insoluble calcium compounds, subjecting the acids to distillation to form a distillate substantially free from acids containing more than 10 carbon atoms, esterifying the acids present in said distillate, and blending a quantity of the resultant esters with a much larger quantity of the aforesaid alcoholic distillate.

2. In the manufacture of a potable spirit of the group, whiskey, brandy, and rum of fine body, flavor, and aroma, the improvement which comprises distilling the fermentation product from which said spirit is derived to form an alcoholic distillate having an alcohol content above 40%, distilling off an aqueous alcoholic concentrate from said fermentation product, neutralizing the acids of said concentrate by means of an alkaline calcium compound to form water-insoluble calcium compounds of acids containing more than four carbon atoms, mechanically separating the insolubles from aqueous solution, acidifying the insolubles to liberate free acids from said insoluble calcium compounds, subjecting the acids to distillation to form a distillate substantially free from acids containing more than ten carbon atoms, esterifying the acids present in said distillate, and blending a quantity of the resultant esters with a much larger quantity of the aforesaid alcoholic distillate.

3. In the manufacture of a potable spirit of the group, whiskey, brandy, and rum of fine body, flavor, and aroma, the improvement which comprises distilling the fermentation product from which said spirit is derived to form an alcoholic distillate having an alcohol content above 40%, distilling off an aqueous aliphatic acid concentrate from said fermentation product, neutralizing the acids of said concentrate by means of an alkaline calcium compound to form water-insoluble calcium compounds of acids containing more than four carbon atoms, mechanically separating the insolubles from aqueous solution, acidifying the insolubles to liberate free acids from said insoluble calcium compounds, subjecting the acids to distillation to form a distillate substantially free from acids containing more than ten carbon atoms, passing vapors of the aforesaid alcoholic distillate through a heated liquid body of said acids so as to esterify the acids, withdrawing and condensing the vapors of said distillate containing said esters to form a condensate the alcohol content of which is much larger than its ester content.

FRED E. MILLER.